(12) United States Patent
Takahashi et al.

(10) Patent No.: US 10,321,380 B2
(45) Date of Patent: Jun. 11, 2019

(54) DEVICE, SYSTEM, METHOD AND RECORDING MEDIUM FOR GENERATING OR PROCESSING COMMUNICATION FRAME

(71) Applicant: CASIO COMPUTER CO., LTD., Shibuya-ku, Tokyo (JP)

(72) Inventors: Toshihiro Takahashi, Hamura (JP); Takahiro Tomida, Hamura (JP); Ryo Okumura, Hamura (JP); Tsutomu Terazaki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 330 days.

(21) Appl. No.: 15/270,190

(22) Filed: Sep. 20, 2016

(65) Prior Publication Data
US 2017/0156101 A1 Jun. 1, 2017

(30) Foreign Application Priority Data

Nov. 27, 2015 (JP) ................................. 2015-231188

(51) Int. Cl.
*H04W 40/24* (2009.01)
*H04L 5/00* (2006.01)
(Continued)

(52) U.S. Cl.
CPC ......... *H04W 40/244* (2013.01); *H04L 5/0053* (2013.01); *H04L 5/0055* (2013.01);
(Continued)

(58) Field of Classification Search
CPC .... H04W 40/244; H04W 76/02; H04L 5/0055
See application file for complete search history.

(56) References Cited

U.S. PATENT DOCUMENTS 8,462,720 B2 * 6/2013 Hong .................... H04W 28/06
370/329
2004/0165548 A1 * 8/2004 Backes ................. H04L 47/125
370/328
(Continued)

FOREIGN PATENT DOCUMENTS

JP 2012-519439 8/2012

OTHER PUBLICATIONS

IEEE Standard for Local and metropolitan area networks—Part 15.6: Wireless Body Area Networks, IEEE Std 802.15.6-2012, 1-271 pages, Feb. 29, 2012 (Year: 2012).*

*Primary Examiner* — Rasheed Gidado
(74) *Attorney, Agent, or Firm* — Amin, Turocy & Watson LLP

(57) ABSTRACT

According to an aspect of the present invention, a device for generating frames for communication according to a specific communication protocol is provided. The communication protocol defines a plurality of kinds of frame formats and a beacon frame format defined by the communication protocol specifies a plurality of fields to be included in a beacon frame. The device generates a frame based on a frame format defined by the communication protocol. The device generates a beacon frame so that at least one of the plurality of fields specified by the beacon frame format defined by the communication protocol is omitted.

11 Claims, 18 Drawing Sheets

(51) Int. Cl.
*H04W 76/10* (2018.01)
*H04W 52/02* (2009.01)

(52) U.S. Cl.
CPC ........ *H04W 76/10* (2018.02); *H04W 52/0206* (2013.01); *H04W 52/0229* (2013.01); *H04W 52/0258* (2013.01); *Y02D 70/00* (2018.01); *Y02D 70/142* (2018.01); *Y02D 70/144* (2018.01); *Y02D 70/20* (2018.01)

(56) References Cited

U.S. PATENT DOCUMENTS

| 2006/0209770 | A1* | 9/2006 | Monaco | H04W 48/04 370/338 |
| 2014/0192713 | A1* | 7/2014 | Park | H04B 7/2656 370/328 |

* cited by examiner

DEVICE, SYSTEM, METHOD AND RECORDING MEDIUM FOR GENERATING OR PROCESSING COMMUNICATION FRAME

CROSS-REFERENCE TO RELATED APPLICATIONS

This application is based upon and claims the benefit of priority under 35 USC 119 of Japanese Patent Application No. 2015-231188 filed on Nov. 27, 2015, the entire disclosure of which is incorporated herein by reference in its entirety for all purposes.

BACKGROUND OF THE INVENTION

1. Field of the Invention

The present invention relates to a device, a system, a method and a computer readable recording medium for recording a program thereon for generating or processing communication frames.

2. Description of the Related Art

Conventionally, many research studies have been done on application of the information communication technology to fields where devices disposed in close vicinity to a human body are used, such as health and medical care. The institute of electrical and electronics engineers (IEEE) 802 LAN/MAN Standards Committee proposed the 802.15.6 standard protocol for the purpose of low-power local area wireless communication for Body Area Network (BAN) applications.

The 802.15.6 protocol defines a physical (PHY) layer and a medium access control (MAC) sublayer for the wireless BAN (also referred to as WBAN) operating in-body, on-body, or off-body. Here, the "body" is not limited to the human body and includes bodies of animals and organisms having propagation environment similar to the human body.

According to the 802.15.6 protocol, a device belonging to a BAN serves as a hub or a node. One hub and one or more nodes form an independent network. Since a communication device, in particular, a mobile device included in the network is often powered by a small battery, it is important to reduce power consumption in order to increase device operating time of the device.

As an example of a technology for saving the battery life, Japanese Patent Application Laid-Open Publication No. 2012-519439 published on Aug. 23, 2012, discloses a wireless sensor network including a device for determining a suitable sleep pattern based on detected parameter values and a current battery charge level and transmitting the sleep pattern to a different device included in the network, which controls its operation based on the sleep pattern.

SUMMARY OF THE INVENTION

The hub operating in beacon mode should send one or more beacon signals in every active beacon period (superframe). Conventionally, the beacon signal is sent in a form of a beacon frame having a predetermined format and includes a big amount of information (data) necessary for connection and data communication between the hub and the node. Thus, the hub consumes a considerable quantity of power to send the beacon frame.

An object of the present invention is to provide a device, a system, a method and a computer readable recording medium for recording a program thereon for generating or processing frames so as to reduce power consumed for communication.

According to one aspect of the invention, there is provided a device for generating frames for communication according to a specific communication protocol. The device generates a frame based on a frame format defined by the communication protocol. Further, the device generates a beacon frame so that at least one of a plurality of fields specified by a beacon frame format defined by the communication protocol is omitted.

According to one aspect of the invention, there is provided a device for processing frames for communication according to a specific communication protocol. The device processes a frame based on a frame format defined by the communication protocol. In the case that a frame received from other device includes discrimination information indicating that a specific field is omitted from the frame, the device processes the frame based on a frame format defined by the communication protocol and the discrimination information.

According to some embodiments of the invention, it is possible to reduce power consumption of a hub relating to sending of a beacon frame by omitting a part of information of the beacon frame to be sent by the hub.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention.

Here.

DETAILED DESCRIPTION OF THE PREFERRED EMBODIMENT

In the present specification, the invention will be mainly described in connection with embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark).

Hereinafter, embodiments of the present invention will be described with reference to the accompanying drawings. The scope of the invention is not intended to be limited to the illustrated examples.

Figure 1:
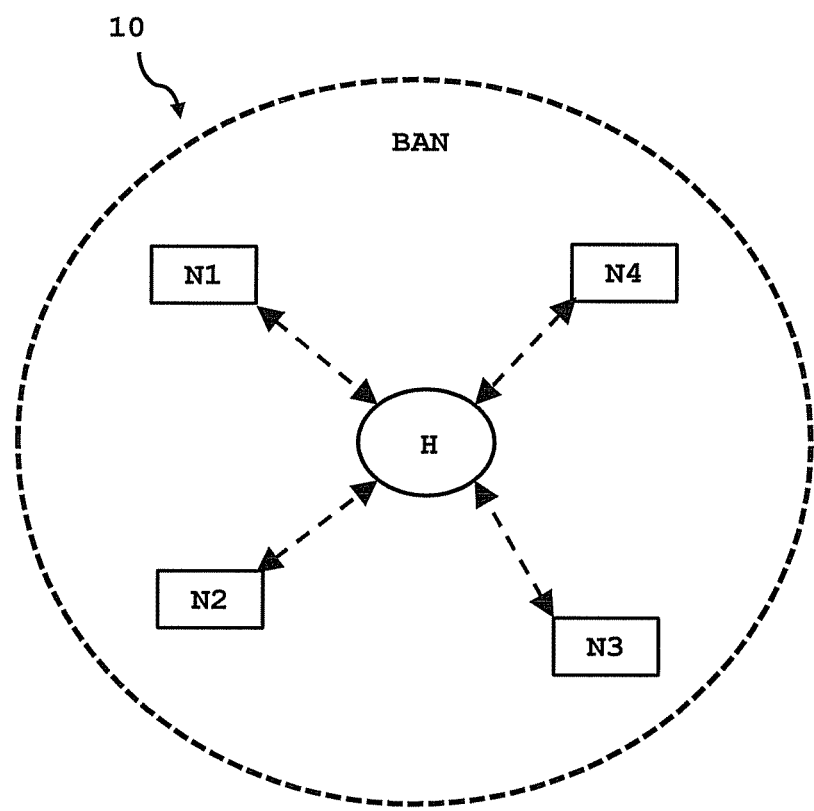
FIG. 1 is a diagram showing a topology of a body area network (BAN).

FIG. 1 is a diagram showing a topology of the body area network (BAN). The BAN 10 includes a device, which plays the role of a hub H, and one or more devices each of which plays the role of a node N. There is to be one and only one hub in a BAN, whereas the number of nodes in the BAN is to range from zero to the maximum number of nodes connectable to the hub (mMaxBANSize). In the example shown in FIG. 1, four nodes N1 to N4 belong to the BAN 10, but the number of nodes is not limited to this example. The hub H is a mobile terminal such as a smart phone or a personal digital assistant (PDA), or an electronic timepiece provided with a communication function, for example. The node N is a bio-signal measuring device, a bio-signal monitoring device or a sensor for measuring/receiving bio-signals and transmitting one to the hub, or an electronic timepiece including one or more of them, for example.

Figure 2:
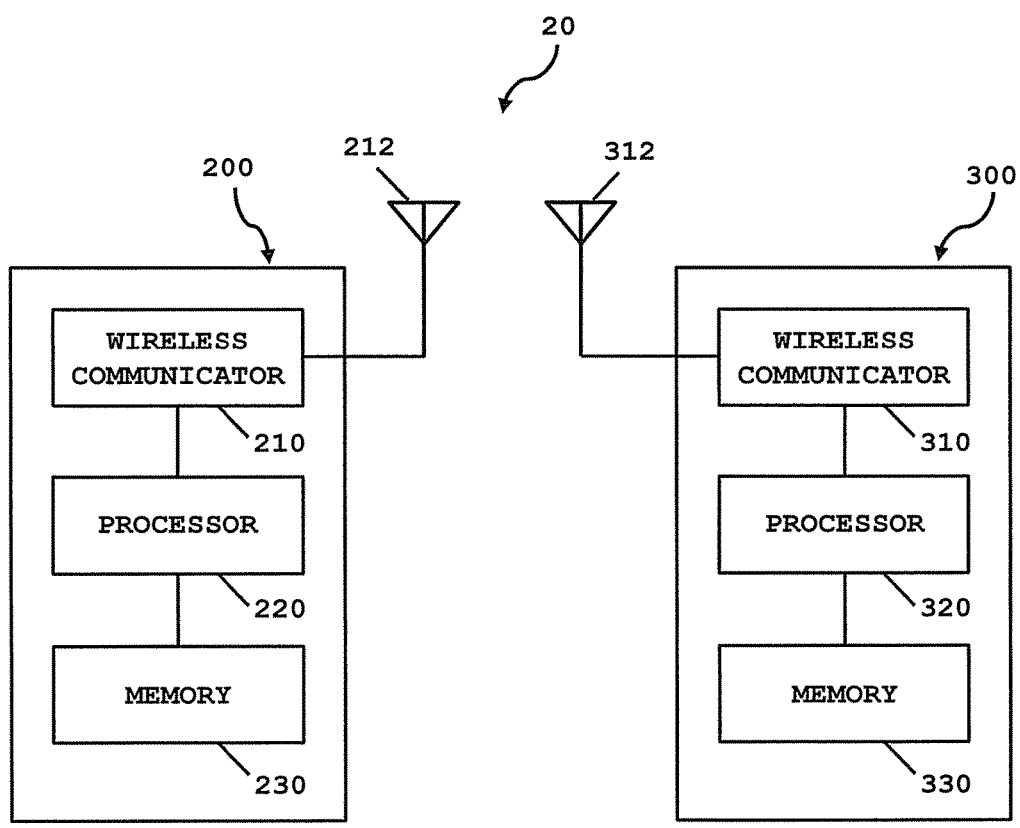
FIG. 2 is a block diagram showing a communication system according to an embodiment of the invention.

FIG. 2 is a block diagram showing a communication system according to an embodiment of the invention. In the present embodiment, a communication system 20 includes a device 200 serving as a hub and a device 300 serving as a node. Although the example of FIG. 2 depicts one node communicating with the hub, the number of node(s) connectable to the hub is not limited to this example. The device 200 communicates with one or more nodes and controls them. The device 300 is a low-power wireless node operating in, on, or around the body (not limited to the human body) for one or more applications such as a medical device, an electronic appliance, or a personal amusement device.

The device 200 includes a wireless communicator 210, a processor 220, and a memory 230. The processor 220 processes messages exchanged via an antenna 212 and the wireless communicator (or, a transceiver) 210 and/or via a wireline connected to the internet or a different body area network (not shown in the drawings). The antenna 212 transmits and receives electromagnetic waves of a frequency corresponding to a wireless communication method adopted by the processor 220. The wireless communicator 210 includes a circuit for transforming an electric signal input from the processor 220 into an electromagnetic wave or transforming a received electromagnetic wave into an electric signal to output it to the processor 220. These electric signals are transmitted and received on a frame-by-frame basis. In the present embodiment, the processor 220 generates a frame to be transmitted to other device, for example, the device 300, according to the BAN protocol, and processes a frame received from other device, for example, the device 300, according to the BAN protocol. The processor 220 may include software, firmware, hardware, or a combination thereof.

The memory 230 can be used to store data such as frame structure information, medium access control information, and power management information, as well as data of frames transmitted or received (hereinafter, referred to as "frame data"). In particular, information on history of connections between the device 200 and other devices (hereinafter, referred to as "history information") can be stored in the memory 230. The history information may include information recorded in a MAC frame received from other device. The information recorded in the MAC frame includes MAC Capability and PHY Capability of the other device, for example. Further, the memory 230 may also be used to store computer program instructions, software and/or firmware executed by the processor 220. The memory 230 may be any storage device such as a RAM (Random Access Memory), a ROM (Read Only Memory), a flash memory, or a disk drive integrated into or removable from the communication device 200. Alternatively, the memory 230 may be any storage device integrated into or removable from the processor 220.

The device 300 includes a wireless communicator 310, a processor 320, and a memory 330. The processor 320 processes messages exchanged via an antenna 312 and the wireless communicator (or, a transceiver) 310. The antenna 312 transmits and receives electromagnetic waves of a frequency corresponding to a wireless communication method adopted by the processor 320. The wireless communicator 310 includes a circuit for transforming an electric signal input from the processor 320 into an electromagnetic wave or transforming a received electromagnetic wave into an electric signal to output it to the processor 320. In the present embodiment, the processor 320 generates a frame to be transmitted to other device, for example, the device 200, according to the BAN protocol, and processes a frame received from other device, for example, the device 200, according to the BAN protocol. The processor 320 may include software, firmware, hardware, or a combination thereof.

The memory 330 can be used to store data such as the frame structure information, the medium access control information and the power management information, as well as the frame data transmitted or received. In particular, information recorded in a MAC frame received from other device, for example, the device 200 can be stored in the memory 330. The information recorded in the MAC frame includes MAC Capability of the other device, for example. Further, the memory 330 may also be used to store computer program instructions, software and/or firmware executed by the processor 320. The memory 330 may be any storage device such as a RAM (Random Access Memory), a ROM (Read Only Memory), a flash memory, or a disk drive integrated into or removable from the communication device 300. Alternatively, the memory 330 may be any storage device integrated into or removable from the processor 320.

The device 200 or 300 can be connected to a sensor (now shown in the drawings) used to monitor data from the body such as body temperature, respiration, heart rate, or blood sugar, or a device (now shown in the drawings) for providing a function of controlling a pace maker, a respirator, an insulin pump, or the like, for example.

The network 10 shown in FIG. 1 and the system 20 shown in FIG. 2 are merely examples and do not limit the scope of systems or devices capable of implementing frame generating methods or frame processing methods described herein. Any device for generating or processing frames according to the present invention falls within the scope of the invention.

Figure 3:
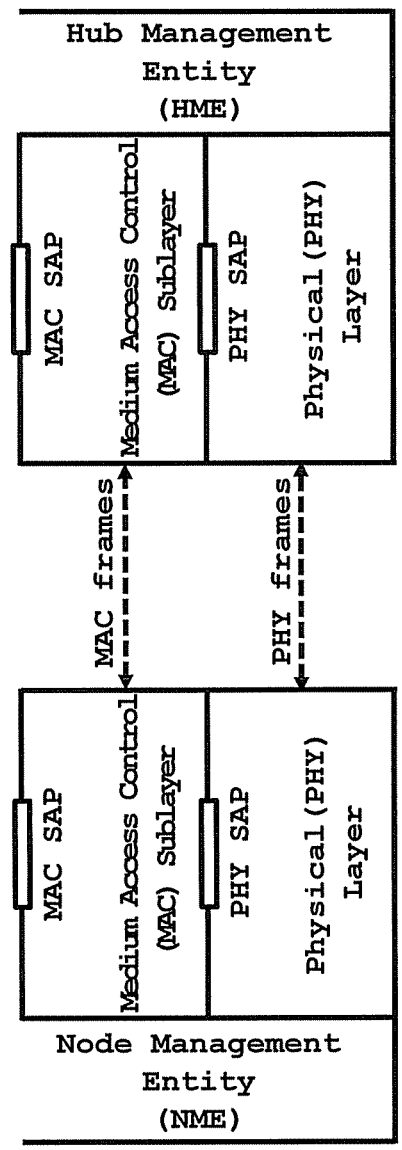
FIG. 3 is a diagram showing a physical (PHY) layer and a medium access control (MAC) sublayer in a hub or a node.

The hub 200 or the node 300 is internally partitioned into a physical (PHY) layer and a medium access control (MAC) sublayer. FIG. 3 is a diagram showing the PHY layer and the MAC sublayer according to the ISO/OSI-IEEE 802 reference model. Direct communications between the node and the hub are to transpire at the PHY layer and the MAC sublayer. In the present embodiment, the PHY layer and the MAC sublayer of the node or the hub are to use only one operating channel at any given time. However, the present invention is not limited thereto.

Within the node or the hub, the MAC provides its service to the MAC client (higher layer) through the MAC service access point (SAP) located immediately above the MAC sublayer, while the PHY provides its service to the MAC through the PHY SAP located between them. On transmission, the MAC client passes MAC service data units (MSDUs) to the MAC sublayer via the MAC SAP, and the MAC sublayer passes MAC frames (also known as MAC protocol data units or MSDUs) to the PHY layer via the PHY SAP. On reception, the PHY layer passes MAC frames to the MAC sublayer via the PHY SAP, and the MAC sublayer passes MSDUs to the MAC client via the MAC SAP.

Figure 4:
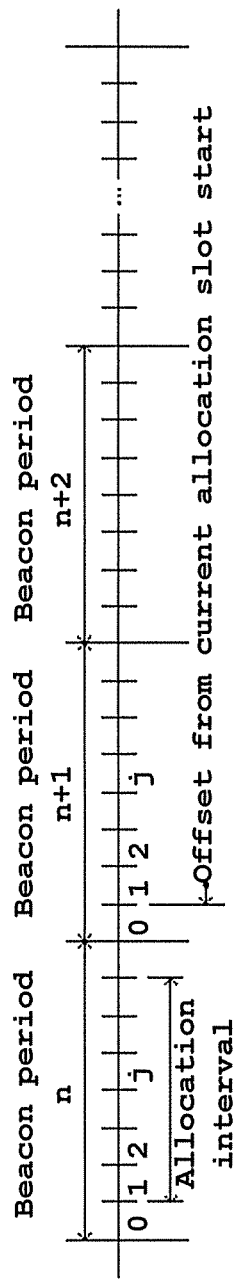
FIG. 4 is a diagram showing a time reference base of the BAN.

In the following, the medium access will be described referring to FIGS. 4 and 5. All nodes and hubs are to establish a time reference base, as shown in FIG. 4, if their medium access is to be scheduled in time. To provide or support time referenced allocations in its BAN, the hub shall establish a time base, which divides the time axis into beacon periods (superframes) regardless of whether it is to transmit beacons. Each beacon period is composed of allocation slots of equal length and numbered from 0, . . . s, where s≤255. In such cases, the hub shall transmit a beacon in each beacon period (superframe), except in inactive superframes, or shall not transmit a beacon in any superframe. In cases where the hub is not to provide or support time referenced allocations in its BAN, it may operate without a time base or superframes and hence without transmitting beacons at all.

According to the IEEE 802.15.6 protocol, the hub shall operate in one of the following three access modes.

(1) Beacon mode with beacon periods (superframes): The hub shall transmit a beacon in each beacon period except in inactive superframes to enable time referenced allocations.

(2) Non-beacon mode with superframes: The hub shall transmit no beacons although access to the medium involves time referencing and superframes and allocation slots are established. In this mode, the hub may have only a managed access phase (MAP) in any superframe.

(3) Non-beacon mode without superframes: Access to the medium involves no time referencing and the hub shall transmit no beacons.

Figure 5:
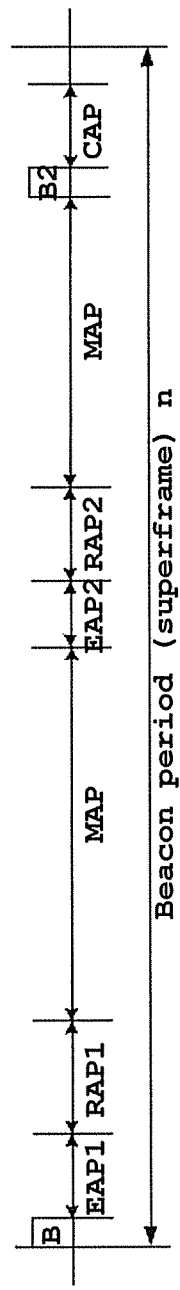
FIG. 5 is a layout of access phases in a beacon period for beacon mode.

FIG. 5 is a layout of access phases in a beacon period for beacon mode. In beacon mode, the hub shall organize access phases in each active beacon period (superframe) as shown in FIG. 5. In FIG. 5, B stands for beacon (B). In an active superframe (beacon period), the hub shall transmit a beacon and may provide access phases. Beacon is a frame transmitted by a hub to facilitate network management, such as the coordination of medium access and power management of the nodes in the body area network (BAN) of the hub, and to facilitate clock synchronization therein. Access phases are used to exchange management, control, and data type frames. In an inactive superframe (beacon period), the hub shall not transmit any beacon and shall not provide any access phases.

The hub shall place exclusive access phase 1 (EAP1), random access phase 1 (RAP1), managed access phase (MAP), exclusive access phase 2 (EAP2), random access phase 2 (RAP2), another managed access phase (MAP), and contention access phase (CAP) in the order shown in FIG. 5. To provide a non-zero length CAP, the hub shall transmit a preceding B2 frame. The hub shall not transmit a B2 frame if the CAP that follows has a zero length.

EAP, RAP, MAP, and CAP are defined as follows.

1) exclusive access phase (EAP): A time span set aside by a hub in a beacon period (superframe) for transfer of the traffic of the highest user priority (UP) (for emergency or medical implant event report).

2) random access phase (RAP): A time span set aside by a hub and announced via a beacon frame for random access to the medium by the nodes in the body area network (BAN) of the hub.

3) managed access phase (MAP): A time span set aside by a hub for improvised access, scheduled access, and unscheduled access to the medium by the hub and the nodes in the body area network (BAN) of the hub.

4) contention access phase (CAP): A time span set aside by a hub and announced via a preceding nonbeacon frame for contention access to the medium by the nodes in the body area network (BAN) of the hub.

As described above, the hub transmits the beacon frame in each beacon period in beacon mode. The beacon frame is transmitted by the hub in order to let nodes know existence of the network of the hub and make the nodes participate in the network. Further, the beacon frame conveys information on functions supported by the hub to a node and let the node know the start of a superframe for synchronization of the hub and the node. In the following, a structure of the beacon frame will be explained in detail. The beacon frame is one kind of MAC frame and a sequence of fields delivered to or from the physical layer service access point (PHY SAP) (see FIG. 3). A format of the MAC frame according to the present embodiment is shown in (A) of FIG. 6. The MAC frame includes a fixed-length MAC header, a variable-length MAC frame body, and a fixed length Frame Check Sequence (FCS) field. The Frame Check Sequence (FCS) field is the footer of the MAC frame. The fields contained in the MAC frame are will be defined in the following. Each of the figures explained below depicts the fields contained in the MAC frame from left to right in the transmit order, with fields that are optional or selectively absent drawn in dashes. Also indicated is the number of octets contained in each field along with the corresponding octet transmit order, on top of the field. Reserved fields are set to zero on transmission and ignored on reception.

Figure 6:
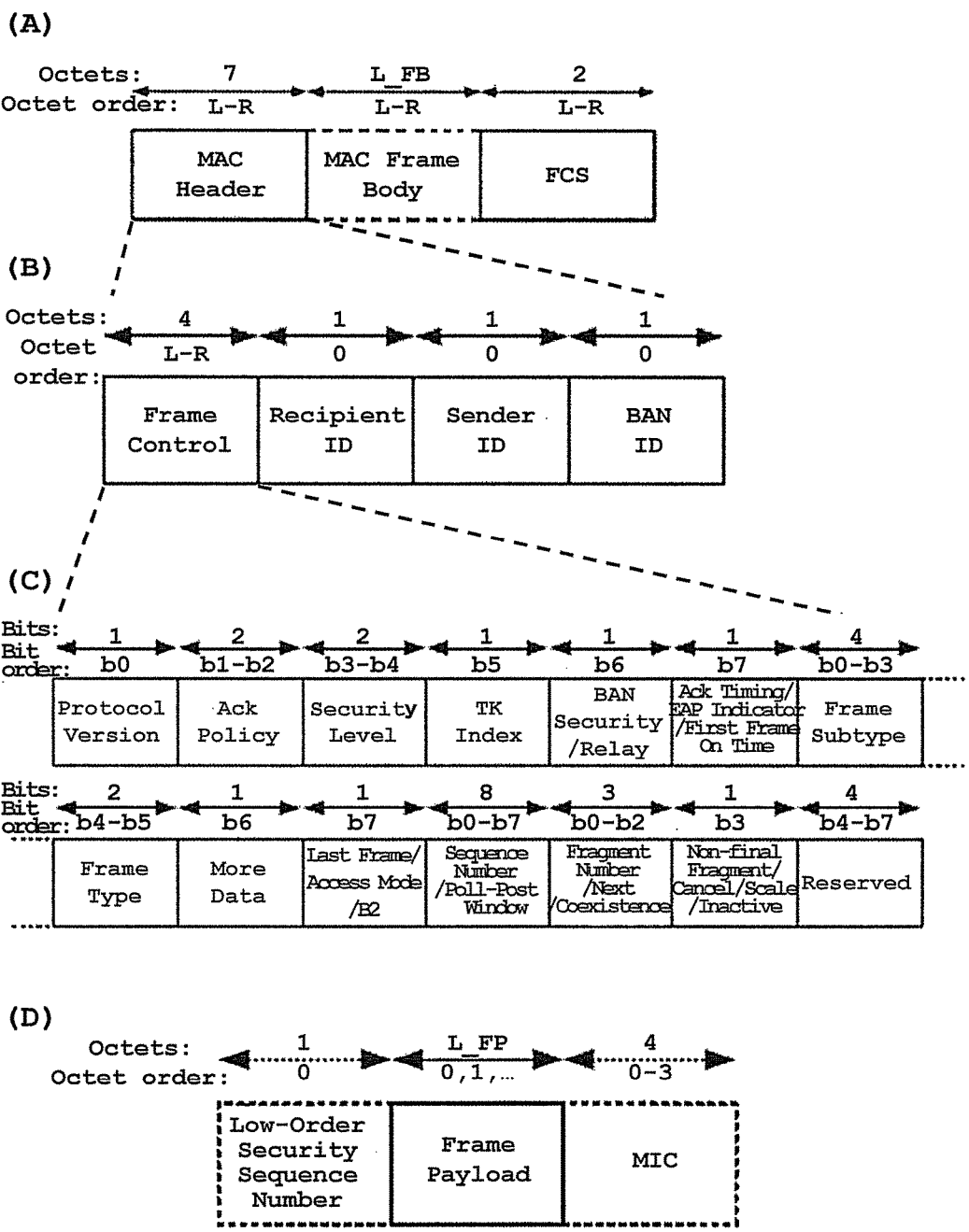
FIG. 6 shows (A) a format of a MAC frame, (B) a format of MAC header, (C) a format of a Frame Control field, and (D) a format of a MAC frame body.

A format of the MAC header according to the present embodiment is shown in (B) of FIG. 6. The MAC header includes Frame Control, Recipient ID, Sender ID, and BAN ID. The Frame Control will be described in detailed in the following. The Recipient ID field is set to the abbreviated address (i.e., NID (Node Identifier) or HID (Hub Identifier)) of the recipient of the current frame. The Sender ID field is set to the abbreviated address (i.e., NID or HID) of the sender of the current frame. The BAN ID field is set to the abbreviated address of the BAN in which the current frame is transferred.

A format of the Frame Control according to the present embodiment is shown in (C) of FIG. 6. Each field of the Frame Control is defined in Section 5.2.1.1 of IEEE Std 802.15.6-2012. Frame Subtype and Frame Type fields of the Frame Control are set to indicate the type of the current frame according to Table 1 below.

TABLE 1

Frame Type and Frame Subtype field encoding

| Frame Type value b5b4 | Frame Type name | Frame Subtype value b3b2b1b0 | Frame Subtype name |
| --- | --- | --- | --- |
| 00 | Management | 0000 | Beacon |
| 00 | Management | 0001 | Reserved |
| 00 | Management | 0010 | Security Association |
| 00 | Management | 0011 | Security Disassociation |
| 00 | Management | 0100 | PTK |
| 00 | Management | 0101 | GTK |
| 00 | Management | 0110-0111 | Reserved |
| 00 | Management | 1000 | Connection Request |
| 00 | Management | 1001 | Connection Assignment |
| 00 | Management | 1010 | Disconnection |
| 00 | Management | 1011-1110 | Reserved |
| 00 | Management | 1111 | Command |
| 01 | Control | 0000 | I-Ack |
| 01 | Control | 0001 | B-Ack |
| 01 | Control | 0010-0011 | Reserved |
| 01 | Control | 0100 | I-Ack + Poll |
| 01 | Control | 0101 | B-Ack + Poll |
| 01 | Control | 0110 | Poll |
| 01 | Control | 0111 | T-Poll |
| 01 | Control | 1000-1101 | Reserved |
| 01 | Control | 1110 | Wakeup |
| 01 | Control | 1111 | B2 |
| 10 | Data | 0000 | User Priority 0 or Allocation Mapped Data Subtype |
| 10 | Data | 0001 | User Priority 1 or Allocation Mapped Data Subtype |
| 10 | Data | 0010 | User Priority 2 or Allocation Mapped Data Subtype |
| 10 | Data | 0011 | User Priority 3 or Allocation Mapped Data Subtype |
| 10 | Data | 0100 | User Priority 4 or Allocation Mapped Data Subtype |
| 10 | Data | 0101 | User Priority 5 or Allocation Mapped Data Subtype |
| 10 | Data | 0110 | User Priority 6 or Allocation Mapped Data Subtype |
| 10 | Data | 0111 | Emergency |
| 10 | Data | 1000-1111 | Allocation Mapped Data Subtype |
| 11 | Reserved | 0000-1111 | Reserved |

As shown in Table 1, the value of the Frame Type indicates the type of the current frame. More specifically, in the case that the value of the Frame Type is 00, the current frame is a Management frame. In the case that the value of the Frame Type is 01, the current frame is a Control frame. In the case that the value of the Frame Type is 10, the current frame is a Data frame. In the case that the value of the Frame Type is 11, the current frame is a Reserved frame. The value of the Frame Subtype is set to the subtype of the current frame. Thus, the combination of the Frame Type value and the Frame Subtype value indicates the kind of the current frame. For example, in the case that the Frame Type value is 00 and the Frame Subtype value is 0000, the current frame is a beacon frame. In the case that the Frame Type value is 00 and the Frame Subtype value is 1000, the current frame is a Connection Request frame. In the case that the Frame Type value is 00 and the Frame Subtype value is 1001, the current frame is a Connection Assignment frame. In the case that the Frame Type value is 01 and the Frame Subtype value is 0000, the current frame is an I-Ack frame.

A format of the MAC frame body according to the present embodiment is shown in (D) of FIG. 6. Low-Order Security Sequence Number and Message Integrity Code (MIC) fields are not present in unsecured frames, as indicated by the Security Level field of the Frame Control field of the MAC header of the current frame. Frame Payload is a sequence of fields to be communicated to the recipient(s). An I-Ack frame transmitted by a node to a hub contains no Frame Payload. An I-Ack frame transmitted by a hub to a node selectively contains a Frame Payload.

Figure 7:
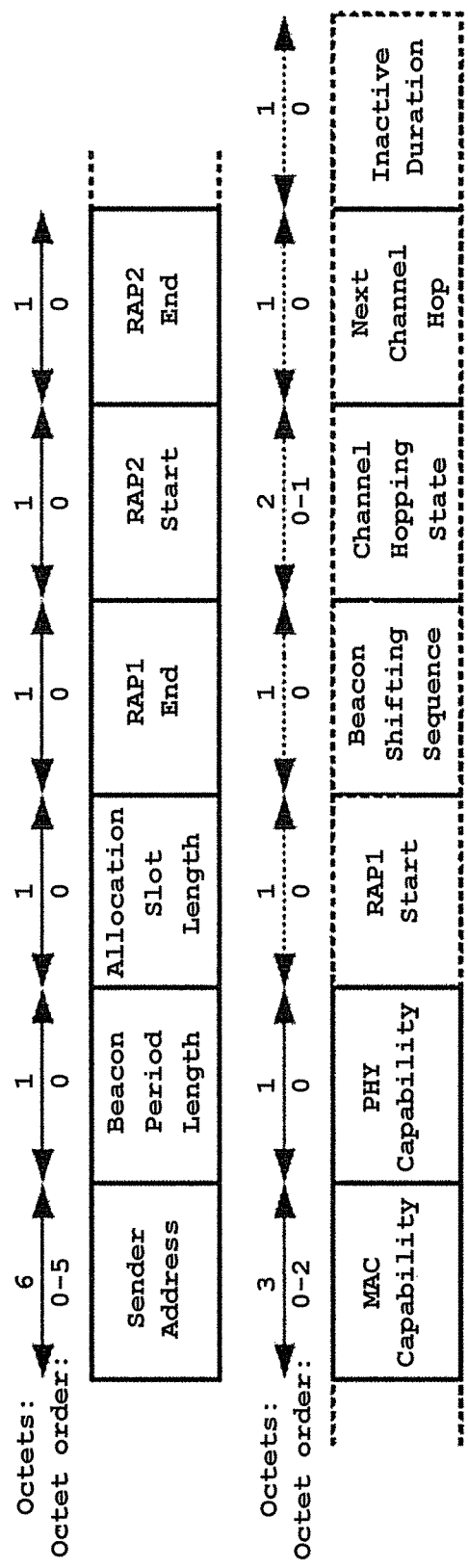
FIG. 7 shows a format of a frame payload of a beacon frame.

The beacon frame contains a frame payload that is formatted as shown in FIG. 7, according to the present embodiment. Each field of the frame payload of the beacon frame is defined as follows.

1. Sender Address: The Sender Address field is set to the EUI-48 of the hub sending the current beacon. (EUI: Extended Unique Identifier)

2. Beacon Period Length: The Beacon Period Length field is set to the length of the current beacon period (superframe), in units of allocation slots.

3. Allocation Slot Length: The Allocation Slot Length field is set to L such that the length of an allocation slot is equal to pAllocationSlotMin+L×pAllocationSlotResolution. Here, pAllocationSlotMin is a minimum slot duration, and pAllocationSlotResolution is an allocation slot resolution.

4. RAP1 Start: The RAP1 Start field is present only if EAP1 has a nonzero length as indicated by the EAP Indicator field of the MAC header of the current beacon frame. When present, it is set to S1 such that random access phase 1 (RAP1) starts at the beginning of the allocation slot that is numbered S1 and located in the current beacon period ends EAP1, and it occurs after the PHY Capability field.

5. RAP1 End: The RAP1 End field is set to E1 such that RAP1 ends at the end of the allocation slot that is numbered E1 and located in the current beacon period.

6. RAP2 Start: The RAP2 Start field is set to S2 such that random access phase 2 (RAP2) starts at the beginning of the allocation slot that is numbered S2 and located in the current beacon period if either exclusive access phase 2 (EAP2) or RAP2 is of nonzero length, or is set to zero otherwise. If EAP2 is of nonzero length, it ends at the time indicated by this field. The start time of EAP2 is encoded in Connection Assignment frames.

7. RAP2 End: The RAP2, End field is set to E2 such that RAP2 ends at the end of the allocation slot that is numbered E2 and located in the current beacon period if RAP2 is of nonzero length, or is set to zero otherwise.

Figure 8:
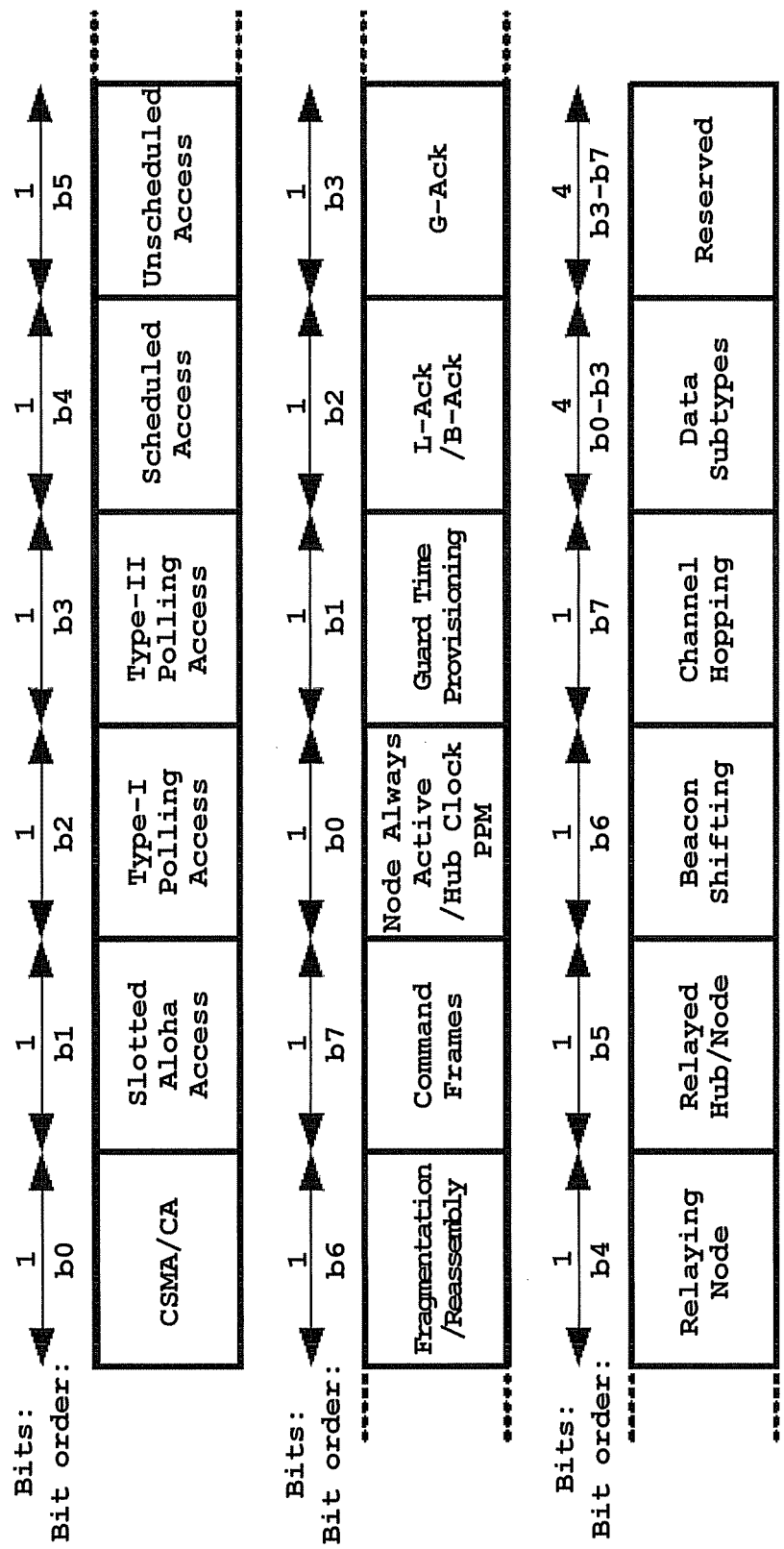
FIG. 8 shows a format of a MAC Capability field.

8. MAC Capability: The MAC Capability field is formatted as shown in FIG. 8 according to IEEE Std 802.15.6-2012. The MAC Capability shows whether or not the sender of the current frame supports various functions and functional requirements. Each field of the MAC Capability is described in detail in Section 5.6.1 of IEEE Std 802.15.6-2012 and briefly defined in the following. 8.1. The CSMA/CA field is set to one if the sender supports contended allocations obtained by using CSMA/CA in exclusive access phase 1 (EAP1), random access phase 1 (RAP1), exclusive access phase 2 (EAP2), random access phase 2 (RAP2), and contention access phase (CAP), or is set to zero otherwise.

8.2. The Slotted Aloha Access field is set to one if the sender supports contended allocations obtained by using slotted Aloha access in EAP1, RAP1, EAP2, RAP2, and CAP, or is set to zero otherwise.

8.3. The Type-I Polling Access field is set to one if the sender supports type-I polled allocations, or is set to zero otherwise.

8.4. The Type-II Polling Access field is set to one if the sender supports type-II polled allocations, or is set to zero otherwise.

8.5. The Scheduled Access field is set to one if the sender supports scheduled allocations, or is set to zero otherwise.

8.6. The Unscheduled Access field is set to one if the sender supports unscheduled bilink allocations, or is set to zero otherwise.

8.7. The Fragmentation/Reassembly field is set to one if the sender supports fragmentation and reassembly, or is set to zero otherwise.

8.8. The Command Frames field is set to one if the sender supports the processing and functionality of Command frames, or is set to zero otherwise.

8.9. The Node Always Active/Hub Clock PPM field is used as a Hub Clock PPM field in frames sent by a hub, which is set to one if the hub has a clock with a minimum accuracy of ppm=mHubClockPPMLimit/2, or is set to zero if the hub has a clock with a minimum accuracy of ppm=mHubClockPPMLimit.

8.10. The Guard Time Provisioning field is reserved in frames sent by a hub.

8.11. The L-Ack/B-Ack field is set to one if the sender supports both L-Ack and B-Ack acknowledgment, or is set to zero otherwise.

8.12. The G-Ack field is set to one if the sender supports group acknowledgment, or is set to zero otherwise.

8.13. The Relaying Node field is reserved if the sender is a hub.

8.14. The Relayed Hub/Node field is set to one if the sender supports the functionality required of a relayed hub or node in a two-hop extended star BAN, or is set to zero otherwise.

8.15. The Beacon Shifting field is set to one if the sender supports beacon shifting, or is set to zero otherwise.

8.16. The Channel Hopping field is set to one if the sender supports channel hopping, or is set to zero otherwise.

8.17. The Data Subtypes field is set to the maximum number of data subtypes supported by the sender for data type frames received from the recipient of the current frame.

Figure 9:
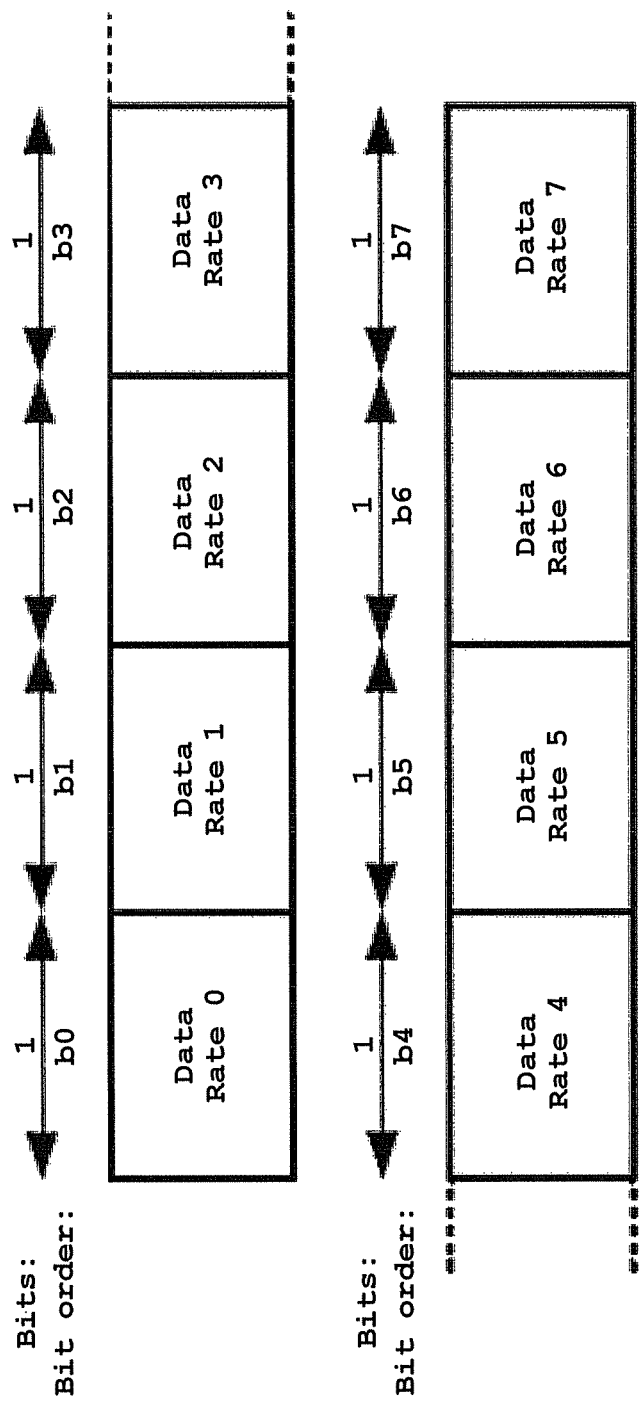
FIG. 9 shows a format of a PHY Capability field.

9. PHY Capability: The PHY Capability field is formatted as shown in FIG. 9 according to IEEE Std 802.15.6-2012. The Data Rate i field of the PHY Capability field is set to one if the sender supports the information data rate for both transmission and reception in the operating frequency band, or is set to zero otherwise. The PHY Capability is described in detail in Section 5.6.2 of IEEE Std 802.15.6-2012.

10. Beacon Shifting Sequence: The Beacon Shifting Sequence is present only if beacon shifting is currently enabled. When present, it indicates the beacon transmission time in the current beacon period (superframe).

11. Channel Hopping State: The Channel Hopping State field is present only if channel hopping is currently enabled. When present, it is set to the current state of a 16-bit maximum-length linear feedback shift register (LFSR) used to generate the channel hopping sequence by the hub sending this beacon.

12. Next Channel Hop: The Next Channel Hop field is present only if channel hopping is currently enabled. When present, it is set to the sequence number of the beacon period (superframe) in which the hub sending the current beacon is to hop to another channel according to its channel hopping sequence.

13. Inactive Duration: The Inactive Duration field is present only if one or more inactive superframes are starting at the end of the current beacon period (superframe). When present, it is set to the number of inactive superframes after each active superframe.

The RAP1 Start, Beacon Shifting Sequence, Channel Hopping State, Next Channel Hop, and Inactive Duration of the above described fields are optional data which are present under predetermined conditions.

As described above, the beacon frame includes the MAC frame header, the MAC frame body, and the FSC. In many embodiments of the present invention, power consumed to send beacon frames by the hub can be reduced by omitting a part of information of the MAC frame body of the beacon frames. According to an embodiment of the present invention, the hub H generates a beacon frame containing a payload in which the MAC Capability field is omitted among the plurality of fields specified by the beacon frame format shown in FIG. 7. Since the MAC Capability field includes a large amount of data as shown in FIG. 8, the power consumption of the hub H can be reduced by sending the beacon frame containing the payload in which the MAC Capability field is omitted.

In the case of omitting the MAC Capability field from the beacon frame as described with respect to the embodiment, it is desirable to notify the node N of the omission of the field. According to an embodiment of the present invention, one bit of four bits which are reserved of the Frame Control field of the MAC header of the beacon frame (see (A) to (C) of FIG. 6) is defined as an Elision field. In the present embodiment, one bit of b4 to b7 bits which are reserved of the Frame Control field of the MAC header of the beacon frame is used as the Elision field. If no field is omitted, the Elision field is set to zero (0). If the MAC capability field is omitted, the Elision field is set to one (1).

In the case that the node N receives the beacon frame from the hub H, it extracts data contained in the MAC header, the MAC frame body, and FSC of the beacon frame, sequentially. According to the extracted value of the Elision field of the Frame Control field of the MAC header, the node N determines whether or not any field is omitted in the payload of the beacon frame. Thus, the value of the Elision field is used as discrimination information indicating whether or not any field is omitted in the beacon frame. More specifically, if the value of the Elision field is zero (0), the node N processes the payload of the beacon frame according to the format shown in FIG. 7. If the value of the Elision field is one (1), the node N processes the payload of the beacon frame according to a format in which the MAC Capability field is omitted from the format shown in FIG. 7. By this, the node N can process the payload of the beacon frame according to the discrimination information included in the header of the beacon frame.

The field used as the Elision field in the present invention is not limited to the above embodiment. In other embodiments, one bit which is reserved and contained in a different field of the Frame Control is used as the Elision field. For example, the Frame Type field or the Frame Subtype field which is reserved (see Table 1) can be used as the Elision field. The kind of field used as the Elision field does not constitute the fundamental idea of the invention.

Figure 10:
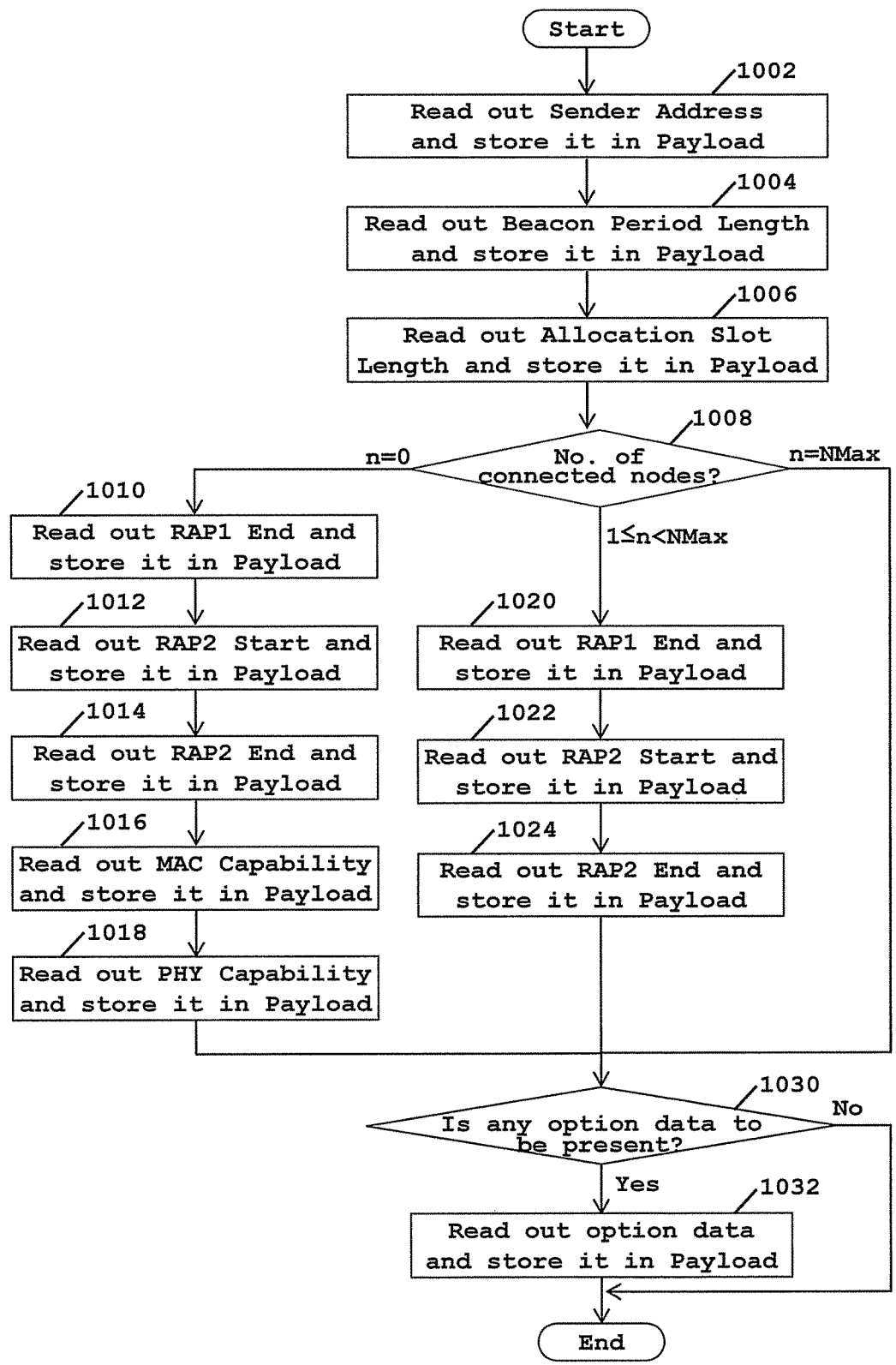
FIG. 10 is a flow chart showing a method for generating a payload of a beacon frame according to an embodiment of the invention.

FIG. 10 is a flow chart showing a method for generating a payload of a beacon frame according to another embodiment of the invention. In the present embodiment, power consumed to send a beacon frame by the hub can be reduced by omitting a part of information of a payload of a MAC frame body of the beacon frame under a predetermined condition. In the following, the generating method of the present embodiment will be explained referring to FIG. 10 together with FIG. 2.

If a process for generating the payload of the beacon frame starts, the processor 220 of the hub 200 reads out "sender address" data (i.e. the address of the hub 200) from the memory 230 and stores it in the Sender Address field of the payload (Step S1002). The processor 220 reads out "beacon period length" data from the memory 230 and stores it in the Beacon Period Length field of the payload (Step S1004). The processor 220 reads out "allocation slot length" data from the memory 230 and stores it in the Allocation Slot Length field of the payload (Step S1006).

Then, the processor 220 reads out the history information relating to connections between the hub 200 and other device(s) stored in the memory 230 and determines "n" which is the number of nodes being connected to the hub 200 (Step S1008). In the case of determining that the hub 200 is not connected with any node (for example, the hub 200 is switched from OFF to ON) (Step S1008: n=0), the processor 220 reads out "RAP1 End" data from the memory 230 and stores it in the RAP1 End field (Step S1010). The processor 220 reads out "RAP2 Start" data from the memory 230 and stores it in the RAP2 Start field (Step S1012). The processor 220 reads out "RAP2 End" data from the memory 230 and stores it in the RAP2 End field (Step S1014). The processor 220 reads out "MAC Capability" data from the memory 230 and stores it in the MAC Capability field (Step S1016). The processor 220 reads out "PHY Capability" data from the memory 230 and stores it in the PHY Capability field (Step S1018). Then, the processor 220 moves the process to Step S1030.

In the case of determining that the number of nodes which are being connected to the hub 200 is equal to or larger than one (1) and less than the maximum number of nodes connectable to the hub 200 (NMax) (Step S1008: 1≤n<NMax), the processor 220 reads out the "RAP1 End" data from the memory 230 and stores it in the RAP1 End field (Step S1020). Here, NMax can be determined according to physical capability of the hub 200 such as its resource and bandwidth or set arbitrarily. The processor 220 reads out the "RAP2 Start" data from the memory 230 and stores it in the RAP2 Start field (Step S1022). The processor 220 reads out the "RAP2 End" data from the memory 230 and stores it in the RAP2 End field (Step S1024). In this case, the MAC Capability field and the PHY Capability field are omitted (in other words, the data of the MAC Capability and the PHY Capability is not stored in the payload of the beacon frame). Then, the processor 220 moves the process to Step S1030.

On the other hand, in the case that it is determined that the number of nodes which are being connected to the hub 200 reaches NMax and it is unwanted to allow more nodes to be connected to the hub 200 (Step S1008: n=NMax), the processor 220 moves the process to Step S1030. Thus, the RAP1 End field, the RAP2 Start field, the RAP2 End field, the MAC Capability field, and the PHY Capability are omitted (in other words, the data of these fields is not stored in the payload of the beacon frame).

At Step S1030, the processor 220 determines whether or not any option field is to be present. As described above, the RAP1 Start, the Beacon Shifting Sequence, the Channel Hopping State, the Next Channel Hop, and the Inactive Duration fields are option fields and each of them is present only under a predetermined condition. In the case that all or a part of the option fields are to be present (Step S1030: YES), the processor 220 reads out necessary information from the memory 230 and stores it to the corresponding option field(s) (Step S1032). In the case that no option field is to be present (Step S1030: NO), the process for generating the payload ends.

According to the present embodiment, it is possible to reduce power consumed to send a beacon frame by sending a beacon frame in which one or more fields including the MAC Capability are omitted (hereinafter, referred to as a "omission-type beacon frame") according to the number of nodes which are being connected to the hub. The present invention is not limited to the above described embodiment. While the PHY Capability is omitted in the case of 1≤n<NMax in the present embodiment, the PHY Capability is not omitted in other embodiments. Further, while the option fields are not considered as fields to be omitted in the present embodiment, one or more of the option fields are omitted even in the case that the conditions for presence of the one or more option fields are met in other embodiments. In addition, while the number of nodes n which are being connected to the hub is determined at Step S1008 in the present embodiment, the step of determining the number n is performed prior to starting generation of the payload in other embodiments.

Figure 11:
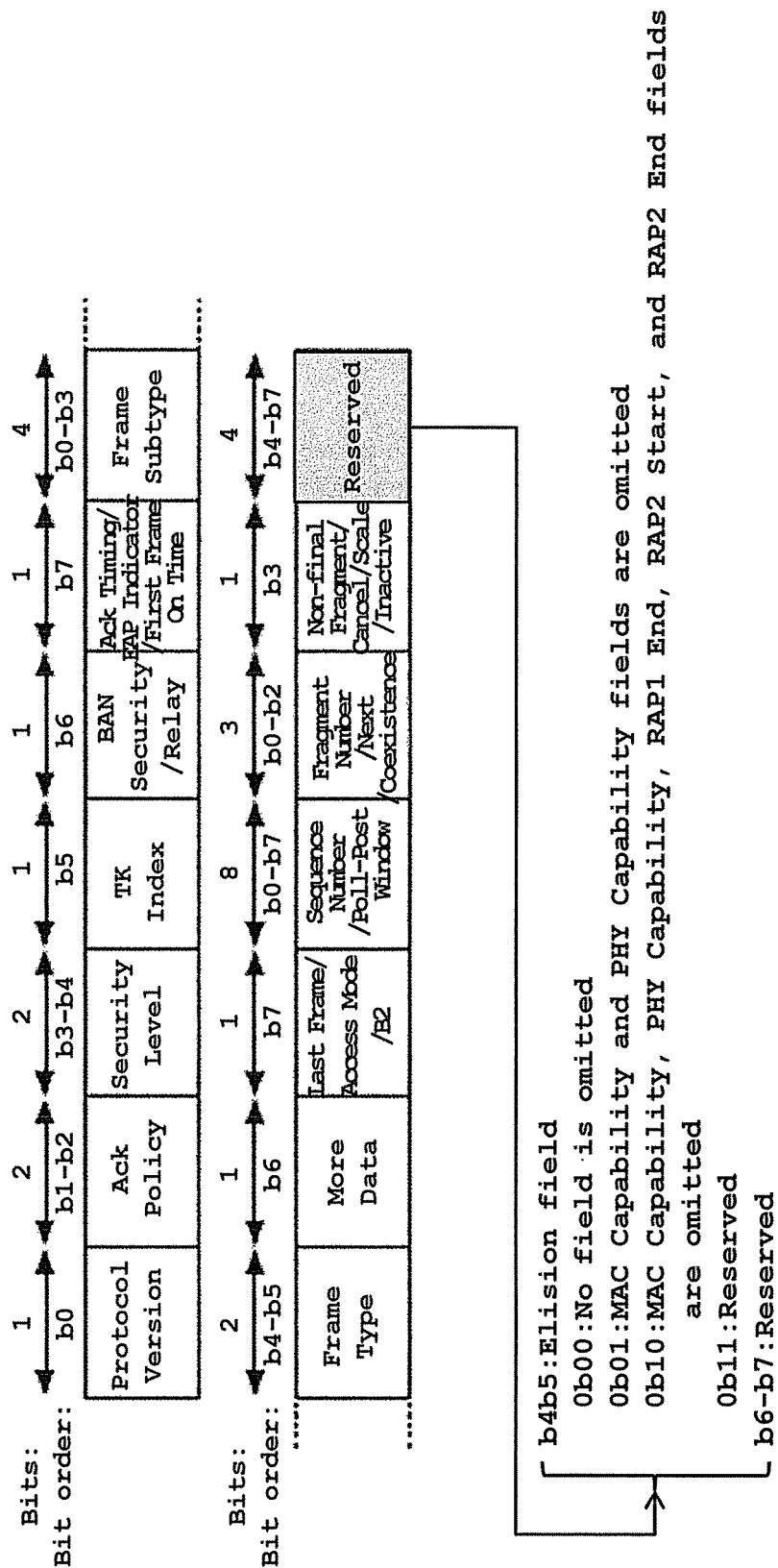
FIG. 11 shows an Elision field of a beacon frame according to an embodiment of the invention.

In the case that some field(s) are omitted from the beacon frame as described with respect to the above embodiment, it is desirable to notify the node of the omission of the field(s). According to an embodiment of the present invention, two bits of the four bits which are reserved of the Frame Control field of the MAC header of the beacon frame (see (A) to (C) of FIG. 6) are defined as the Elision field. As shown in FIG. 11, in the present embodiment, b4 and b5 of b4-b7 bits which are reserved of the Frame Control field of the MAC header of the beacon frame are used as the Elision field. In the present embodiment, the b4b5 field is set to, as follows:

(1) in the case that the hub is switched from OFF to ON, or no node is being connected to the hub (in the embodiment of FIG. 10, n=0 at Step S1008), no field is omitted and b4b5 is set to 0b00;

(2) in the case that the number of nodes which are being connected to the hub is less than the maximum number of nodes connectable to the hub (in the embodiment of FIG. 10, 1≤n<NMax at Step S1008), the MAC Capability field and the PHY Capability field are omitted and b4b5 is set to 0b01 (a first omission-type beacon frame);

(3) in the case that the number of nodes which are being connected to the hub reaches the maximum number of nodes connectable to the hub (in the embodiment of FIG. 10, n=NMax at Step S1008), the RAP1 End, RAP2 Start, RAP2 End, MAC Capability, and PHY Capability fields are omitted and b4b5 is set to 0b10 (a second omission-type beacon frame); and (4) 0b11 is reserved.

Referring to FIG. 2, a method for processing the omission-type beacon frame by the node is described. If the wireless communicator 310 of the node 300 receives a beacon frame, the processor 320 of the node 300 extracts data contained in the MAC header, the MAC frame body, and the FSC of the beacon frame, sequentially. The processor 320 determines whether or not any field is omitted from the payload of the beacon frame and, if any, which field is omitted, according to the value of the Elision field of the Frame Control field of the extracted MAC header. Thus, the value of the Elision field is used as discrimination information indicating whether or not any field is omitted in the beacon frame.

If the value of the Elision field is 0b00, the processor 320 of the node 300 determines that no field is omitted and processes the payload of the beacon frame according to the format shown in FIG. 7. If the value of the Elision field is 0b01, the processor 320 processes the payload of the beacon frame according to a first omission-type format in which the MAC Capability field and the PHY Capability field are omitted from the format shown in FIG. 7. If the value of the Elision field is 0b10, the processor 320 processes the payload of the beacon frame according to a second omission-type format in which the RAP1 End field, the RAP2 Start field, the RAP2 End field, the MAC Capability field, and the PHY Capability are omitted from the format shown in FIG. 7. By this, the processor 320 of the node 300 can process the payload of the beacon frame according to the discrimination information included in the header of the beacon frame.

The field used as the Elision field in the present invention is not limited to the above embodiment. While b4b5 of b4 to b7 bits which are reserved of the Frame Control field of the MAC header are used as the Elision field in the embodiment, different bits (for example, b6b7 bits) are used in other embodiments. In another embodiment, two bits in a different field of the Frame Control which are reserved are used as the Elision field. For example, the Frame Type field or the Frame Subtype field which is reserved (see Table 1) can be used as the Elision field. The kind of field used as the Elision field does not constitute the fundamental idea of the invention.

Figure 12A:
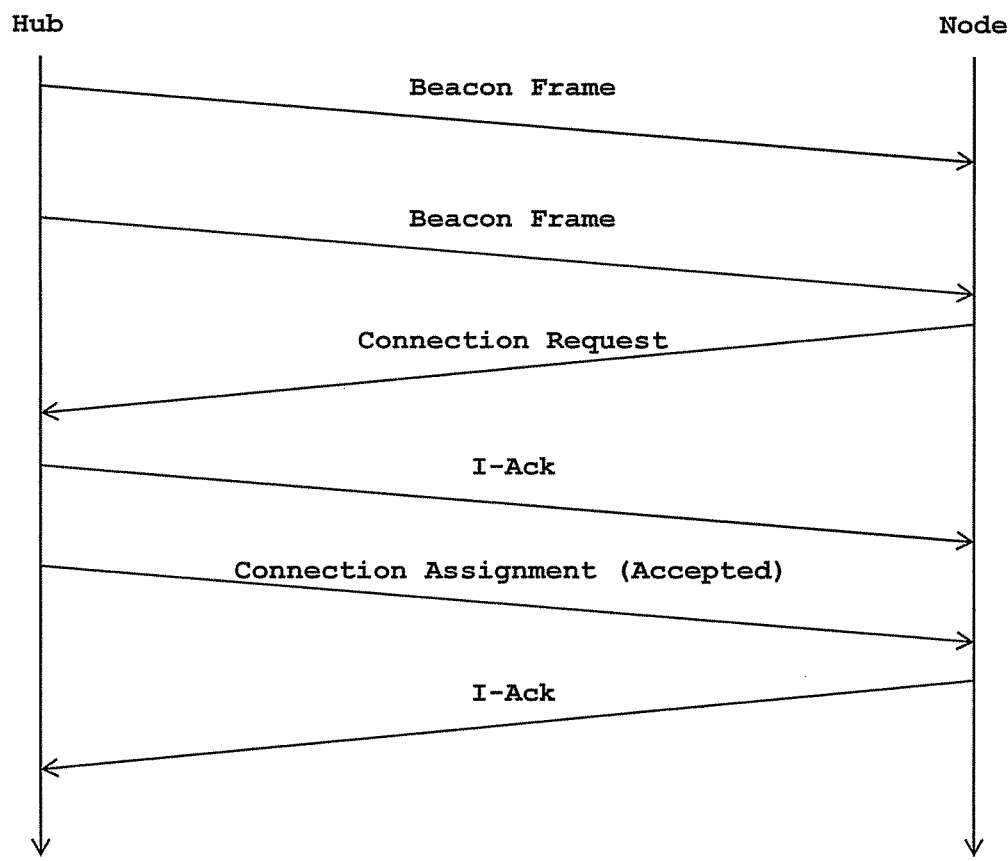
FIG. 12A is a signal flow diagram showing a connection procedure between a hub and a node.
Figure 12B:
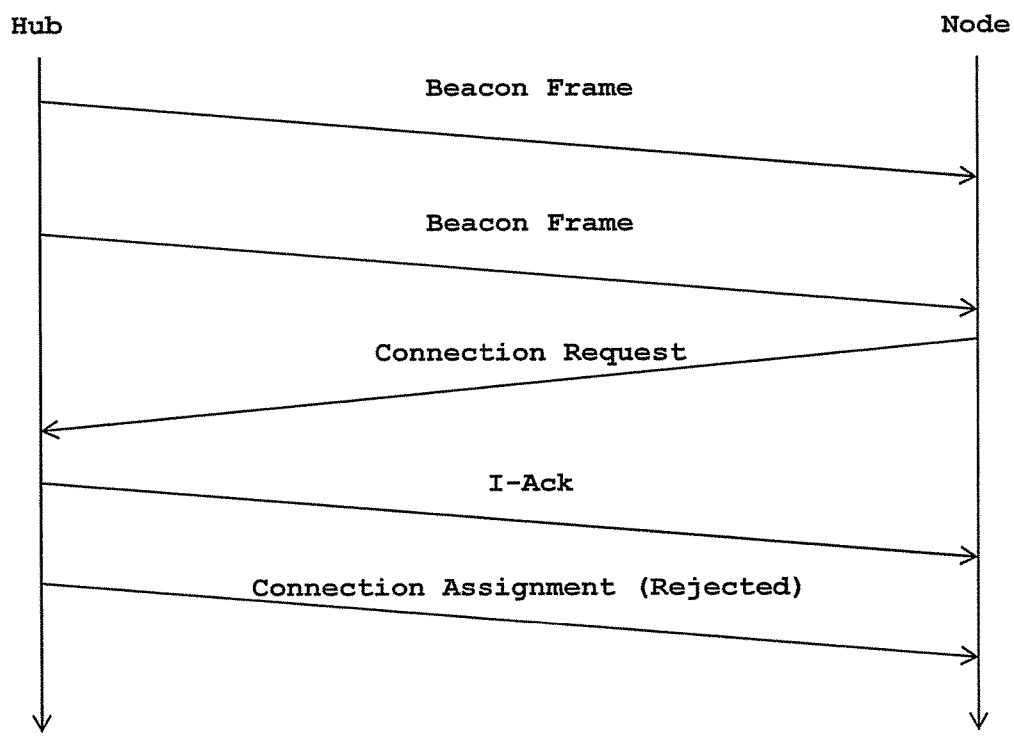
FIG. 12B is a signal flow diagram showing a connection procedure between a hub and a node.
Figure 13A:
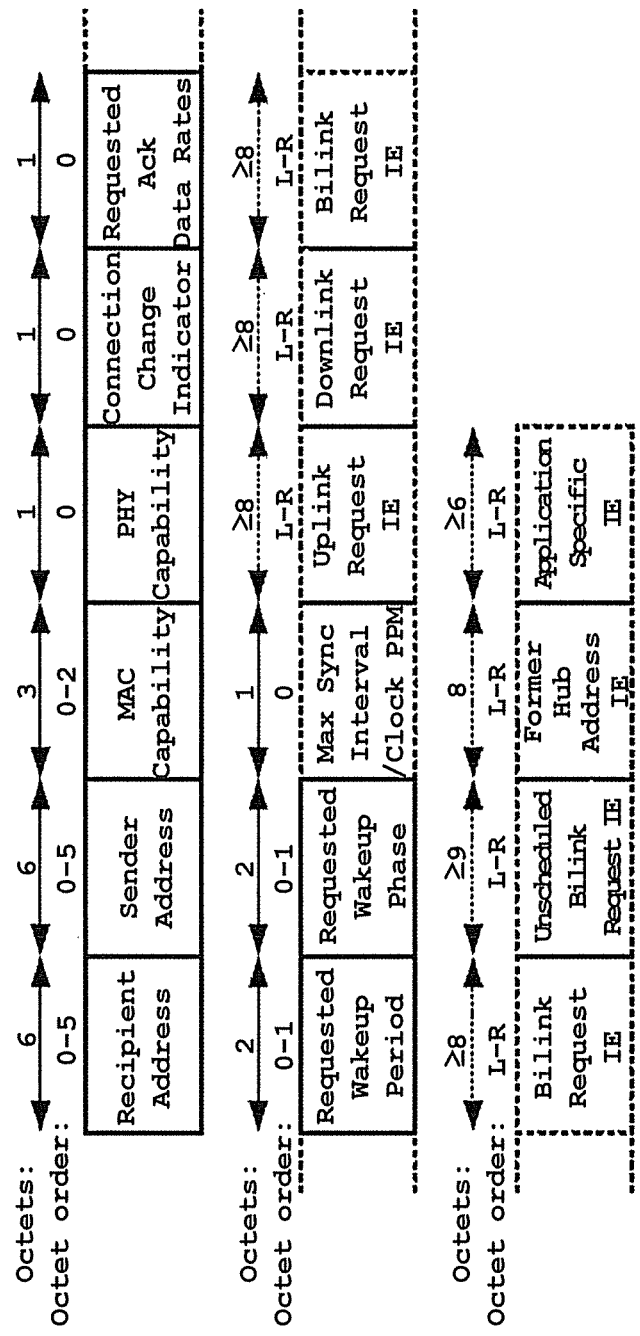
FIG. 13A shows a format of a frame payload of a Connection Request frame.
Figure 13B:
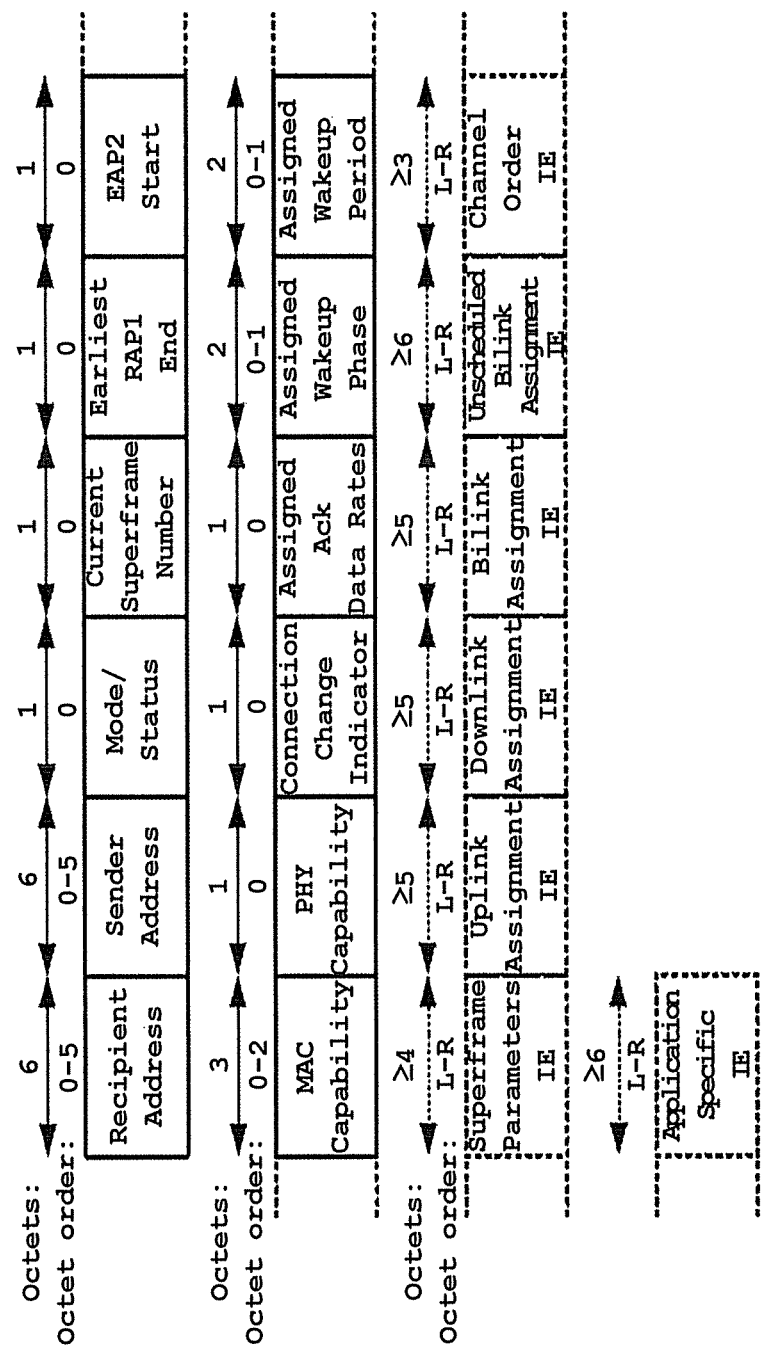
FIG. 13B shows a format of a frame payload of a Connection Assignment frame.

In the following, connection procedures between a hub and a node for reducing the power consumption according to an embodiment of the present invention will be described. First, FIGS. 12A and 12B are signal flow diagrams showing conventional connection procedures between a hub and a node. FIG. 12A shows a signal flow diagram in a case where a connection to the hub is allowable and FIG. 12B shows a signal flow diagram in a case where the connection to the hub is unallowable. As shown in FIG. 12A, the hub sends a beacon frame for letting nodes of existence of the BAN of the hub. If a node unconnected to the hub receives the beacon frame sent from the hub when the node is the wake-up state, the node acquires various kinds of information on the superframe and the network from the beacon frame. The information includes a network ID (the BAN ID, in the present embodiment) and the address of the hub contained in the header of the beacon frame (see (B) and (C) of FIG. 6) and the payload data (see FIG. 7). The node generates a Connection Request frame based on the information acquired from the beacon frame and transmits it to the hub. The Connection Request frame is transmitted by the node to request creation or modification of a connection with the hub. The Connection Request frame includes a frame payload formatted as shown in FIG. 13A. Each field of the frame payload of the Connection Request frame is defined in Section 5.3.6 of IEEE Std 802.15.6-2012. If the hub receives the Connection Request frame from the node during a reception standby time period, the hub transmits to the node an I-Ack (Immediate Acknowledgement) frame for acknowledging successful reception of the frame. In the case of determining that the connection with the node is allowable, the hub generates a Connection Assignment frame and transmits it to the node. The Connection Assignment frame is transmitted by the hub to respond a connection request or to initiate or change a connection assignment. The Connection Assignment frame includes a frame payload formatted as shown in FIG. 13B. Each field of the frame payload of the Connection Assignment frame is defined in Section 5.3.7 of IEEE Std 802.15.6-2012. In this case, a Connection Status field of a Mode/Status field of the Connection Assignment frame is set to zero (0) (Connection Request Accepted). If the node receives the Connection Assignment from the hub, the node transmits to the hub an I-Ack frame. By this, the node and the hub are connected and can communicate necessary information (data) with each other.

FIG. 12B shows a signal flow between the hub and the node in a case where the connection to the hub is unallowable. The hub rejects the connection of a node due to: (1) access policy restrictions; (2) invalid or unsupported frame format; (3) no unsecured communication with this hub; (4) no more channel bandwidth for a new connection; (5) no more Connected_NID for a new connection; (6) no more internal resources for a new connection; (7) node's maximum synchronization interval too long to support; (8) node's clock ppm too large to support; (9) beacon shifting enabled but not supported by requestor; or (10) channel hopping enabled but not supported by requestor (see Section 5.3.7.3.2 of IEEE Std 802.15.6-2012). As described with respect to FIG. 12A, if a node unconnected to the hub receives a beacon frame the hub when the node is the wake-up state, the node acquires various kinds of information on the superframe and the network from the beacon frame. The node generates the Connection Request frame based on the information acquired from the beacon frame and transmits it to the hub. If the hub receives the Connection Request frame from the node, the hub transmits to the node the I-Ack frame for acknowledging successful reception of the frame. The hub generates a Connection Assignment frame in which the Connection Status field of the Mode/Status field is set to one (1) to ten (10) according to the reason of rejecting the connection and transmits it to the node. If the node receives the Connection Assignment frame, the node determines that the connection is unallowable and ends the connection procedure.

As described above, a beacon frame containing a large amount of data is sent in every beacon period regardless of whether or not a connection to the hub is allowable in the conventional connection procedure (or a normal mode). Further, the hub sets the reception standby time period aside for reception of the Connection Request frame transmitted from the node even in the case that the hub does not allow the connection of the node. In addition, the node generates and transmits the Connection Request frame even in the case that the connection to the hub is not possible.

Figure 14A:
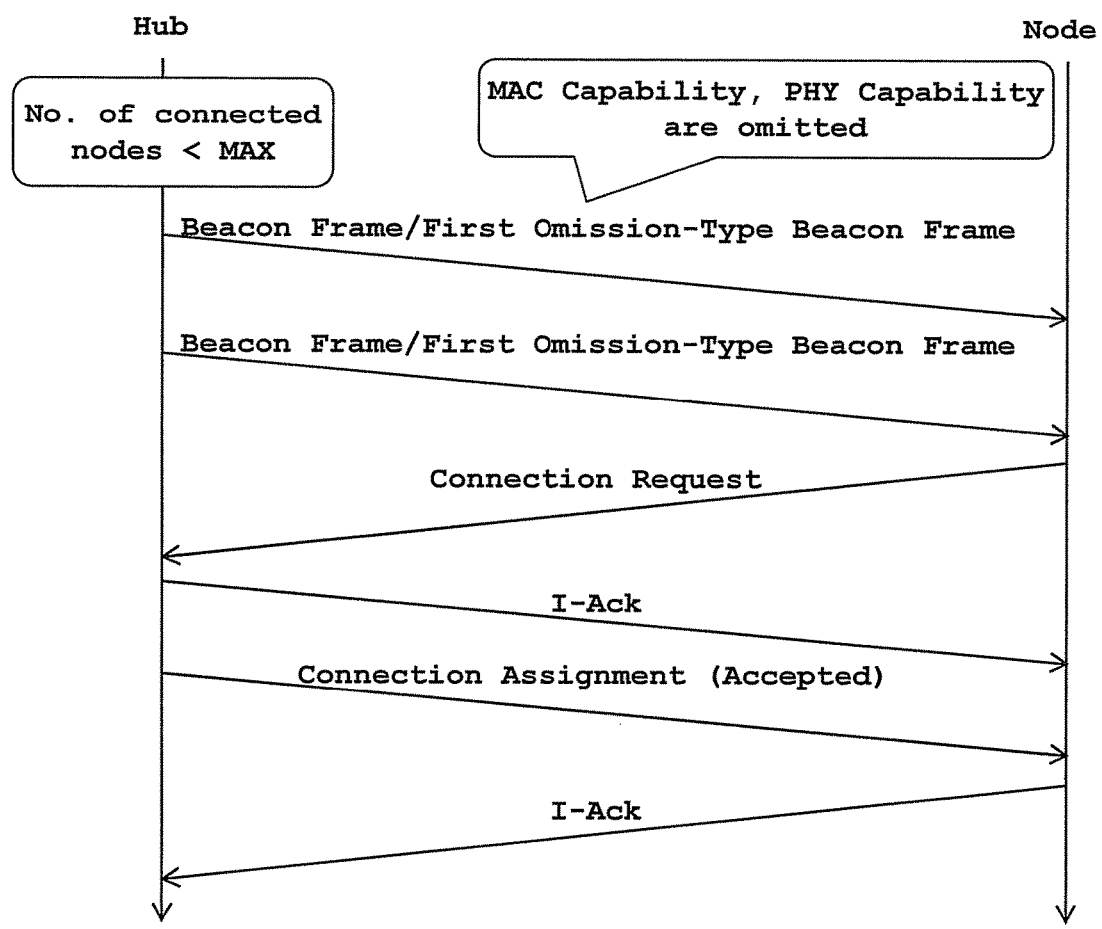
FIG. 14A is a signal flow diagram showing a connection procedure between a hub and a node according to an embodiment of the invention.
Figure 14B:
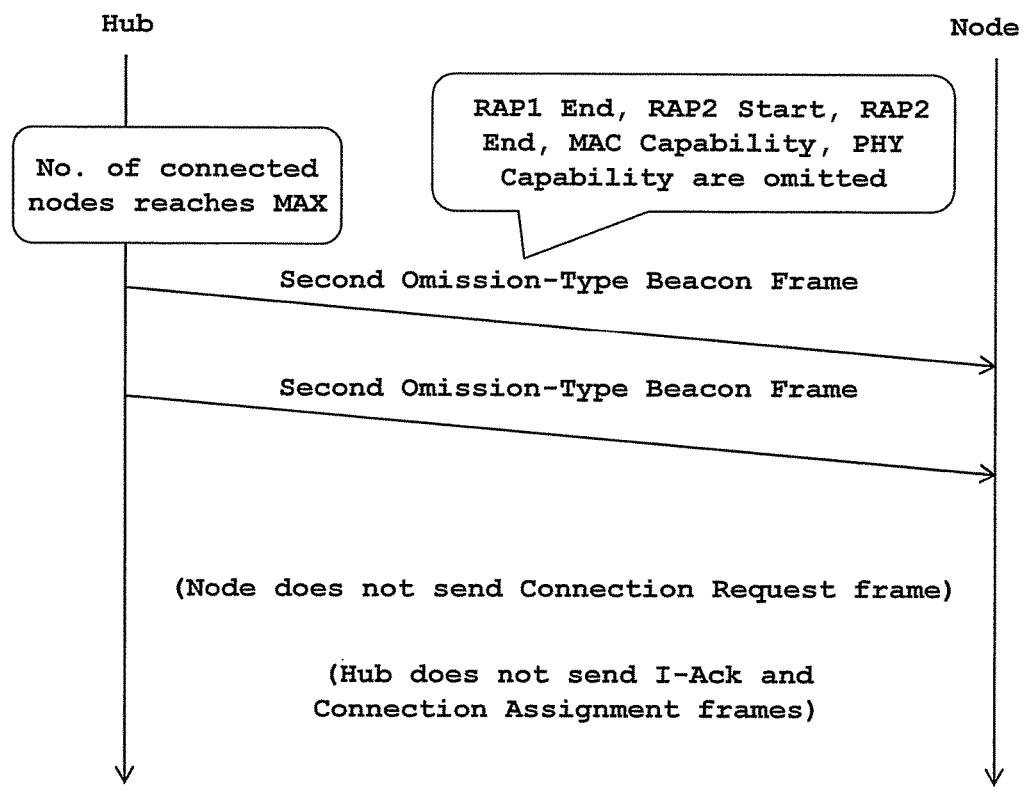
FIG. 14B is a signal flow diagram showing a connection procedure between a hub and a node according to an embodiment of the invention.

FIGS. 14A and 14B are signal flow diagrams showing connection procedures between a hub and a node according to the embodiment. FIG. 14A shows a connection procedure in a situation where a connection to the hub is allowed because the number of nodes which are being connected to the hub is less than the maximum number of nodes connectable to the hub (for example, 0≤n<NMax at Step S1008 in the embodiment of FIG. 10) and there is no reasons of rejecting the connection. In the case that no node is being connected to the hub, the hub sends the conventional beacon frame. On the other hand, in the case that the number of nodes which are being connected to the hub is equal to or larger than one (1) and less than the maximum number of nodes connectable to the hub, the hub transmits the first omission-type beacon frame in which the MAC Capability field and the PHY Capability field are omitted. As described with respect to FIG. 11, it is desirable to set the Elision field for notifying the node of the omission of the fields, i.e. two of the four bits which are reserved of the Frame Control field of the MAC header of the beacon frame to 0b01. Of course, a different field may be used as the Elision field. If the node receives the beacon frame, the node generates the Connection Request frame and transmits it to the hub. If the hub receives the Connection Request frame from the node, the hub transmits the I-Ack frame to the node. Then, the hub generates the Connection Assignment frame and transmits it to the node. The Connection Status field of the Connection Assignment frame is set to zero (0) (Connection Request Accepted). If the node receives the Connection Assignment frame from the hub, the node transmits the I-Ack frame to the hub. By this, the node and the hub are connected and can communicate necessary information (data) with each other.

FIG. 14B shows a connection procedure in a situation where the number of nodes which are being connected to the hub reaches the maximum number of nodes connectable to the hub (for example, n=NMax at Step S1008 in the embodiment of FIG. 10). As shown, the hub sends the second omission-type beacon frame in which the RAP1 End field, the RAP2 Start field, the RAP2 End field, the MAC Capability field, and the PHY Capability are omitted. In the present embodiment, as described with respect to FIG. 11, the Elision field for notifying the node of omission of the fields, i.e. two of the four bits (b4b5) which are reserved of the Frame Control field of the MAC header of the beacon frame is set to 0b10. If the node receives the beacon frame and the Elision field of the received beacon frame is set to 0b10, the node determines that the connection is unallowable and does not perform generation and transmission of a Connection Request frame. Further, since the hub needs not maintain the state in which it can receive a Connection Request frame from the node, the hub can operate in a low-power mode in which the reception standby time period for the Connection Request frame is removed.

In the present embodiment, in the case that the number of nodes which are being connected to the hub reaches the maximum number, of nodes connectable to the hub, the hub sends the beacon frame in which the RAP1 End field, the RAP2 Start field, the RAP2 End field, the MAC Capability field, and the PHY Capability are omitted. Also, in the case that the hub does not allow the connection of the node for any other reason, the hub may send the beacon frame in which the fields are omitted.

According to the embodiment shown in FIG. 14B, it is possible to reduce more power consumption than the connection procedure shown in FIG. 12B, for reasons as set forth below.

First, since the hub sends the second omission-type beacon frame in which the RAP1 End field, the RAP2 Start field, the RAP2 End field, the MAC Capability field, and the PHY Capability are omitted, it is possible to reduce power consumed to send the beacon frame by the hub.

Secondly, since the hub can operate in the low-power mode for reducing unnecessary reception standby time period after it sends the second omission-type beacon frame, it is possible to reduce the power consumption of the hub.

Thirdly, the node can determine whether or not the connection to the hub is allowable from the value of the Elision field contained in the MAC header of the beacon frame and does not transmit the Connection Request frame if the connection is unallowable. Therefore, the node does not waste power to generate and transmit the Connection Request frame.

In other embodiments, the fields to be omitted are not limited to the RAP1 End field, the RAP2 Start field, the RAP2 End field, the MAC Capability field, and the PHY Capability field, and some fields of the above fields are not omitted. Further, some of the option fields may be omitted in some embodiments. In addition, the Elision field is not limited to b4b5 of the four bits which are reserved of the Frame Control field of the MAC header of the beacon frame and a different field may be used as the Elision field in another embodiment.

Second Embodiment

Figure 15A:
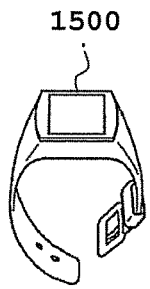
FIG. 15A shows an exterior view of a timepiece type device according to an embodiment of the invention.
Figure 15B:
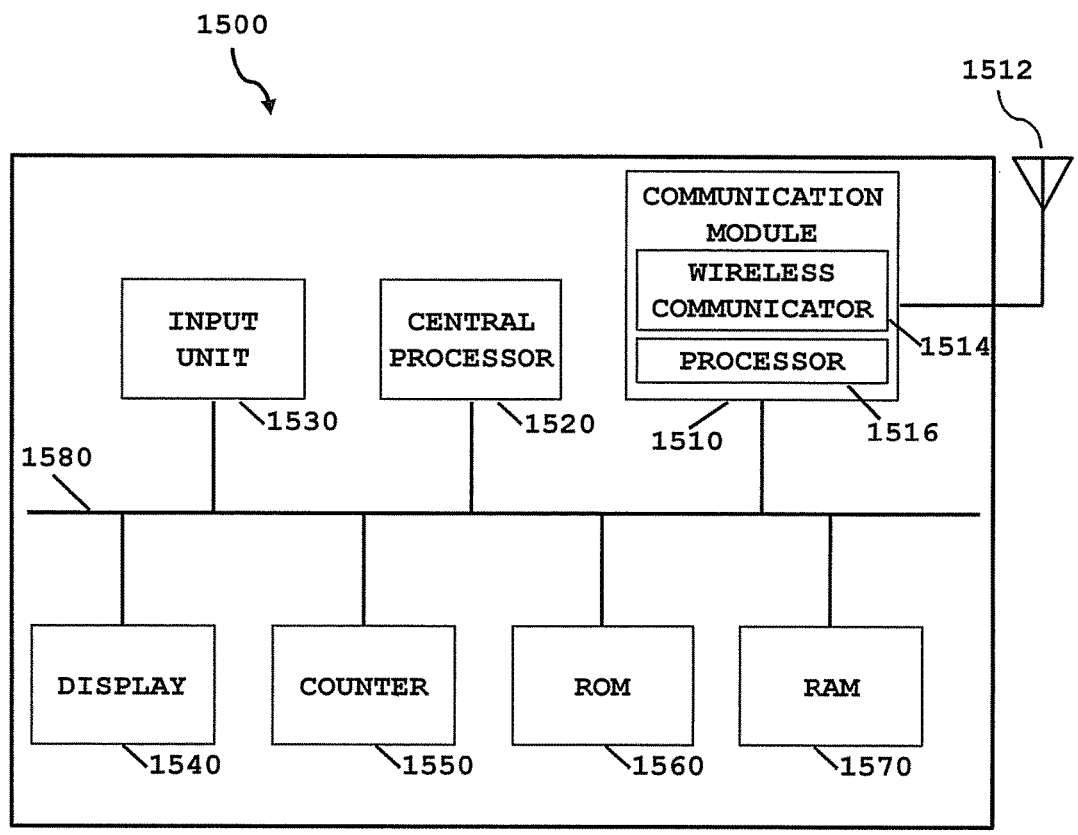
FIG. 15B is a block diagram showing a hardware configuration of the timepiece type device of FIG. 15A.

FIGS. 15A and 15B show an embodiment of a device capable of functioning as the hub or the node in the BAN. FIG. 15A shows an exterior view of the device and FIG. 15B is a block diagram showing a hardware configuration of the device. In the present embodiment, the device is an electronic timepiece. As shown in FIG. 15B, an electronic timepiece 1500 includes a communication module 1510 and the communication module 1510 includes an antenna 1512, a wireless communicator 1514, and a processor 1516. The processor 1516 processes messages exchanged via the antenna 1512 and the wireless communicator 1514 and/or via a wireline connected to the internet or a different body area network (not shown in the drawing). The processor 1516 may include software, firmware, or hardware. Since the configurations and functions of the antenna 1512, the wireless communicator 1514, and the processor 1516 are the same as those of the antenna 212 or 312, the wireless communicator 210 or 310, and the processor 220 or 320 as described with respect to FIG. 2, more detailed explanation on them is omitted. Further, the communication module 1510 may include a memory (not shown in the drawing) for storing frame data exchanged with other device, data such as the frame structure information, the medium access control information and the power management information, computer program instructions, software and/or firmware executed by the processor 1516, or the like.

A central processor 1520 includes a processing unit such as a CPU (Central Processing Unit) and controls operations of the timepiece 1500. For example, the central processor 1520 executes various processes according to programs recorded on a ROM 1560. The configurations and functions of the processor 220 or 320 described with respect to FIG. 2 can be realized by the central processor 1520 or cooperation of the central processor 1520 and the processor 1516.

An input unit 1530 includes a plurality of buttons (here, the buttons may be realized by software and/or hardware) having a function of inputting various information and instructions to the timepiece 1500. If a user manipulates the buttons, the input unit 1530 outputs instructions corresponding to the manipulated buttons to the central processor 1520. The central processor 1520 controls each unit to execute a predetermined operation according to the instructions input from the input unit 1530.

A display 1540 displays various kinds of information such as time or a message received from the outside according to an instruction of the central processor 1520.

A counter 1550 generates time signals from signals generated by a system clock or an oscillator and outputs current time.

The ROM 1560 is used to store control programs executed by the central processor 1520 and the like. Further, the ROM 1560 may be used to store computer program instructions, software and/or firmware executed by the processor 1516.

A RAM 1570 provides a work area when the central processor 1520 executes various processes and is used to store data processed by each unit of the timepiece 1500. The RAM 1570 may be used to store data such as the frame structure information, the medium access control information, and the power management information, as well as the frame data transmitted or received.

The timepiece 1500 can be connected to other device. The other device includes a sensor used to monitor data from the body such as body temperature, respiration, heart rate, or blood sugar, or a device for providing a function of controlling a pace maker, a respirator, an insulin pump, or the like, for example.

The present invention has been described with respect to specific embodiments in which it has been applied to the BAN but its application field is not limited to the BAN. For example, the invention can be applied to different wireless communication technologies such as Bluetooth (Registered Trademark), Wi-Fi (Registered Trademark), and Wi-Fi Direct (Registered Trademark).

The processes described above can be executed by hardware or software. In the case that a specific process is executed by software, a program configuring the software is installed in the communication device serving as the hub or the node from a network or a storage medium. A recording medium for recording such a program thereon includes a removable media which is distributed separately from the device's main body to provide it to users or a recording medium or the like which is provided to users in a state of being incorporated in the device's main body in advance.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A frame generating device for generating frames to communicate with another device via a communication circuit according to a specific communication protocol,
   wherein the frame generating device generates a frame based on a frame format defined by the communication protocol,
   the frame generating device generates a beacon frame so that at least one of a plurality of fields specified by a beacon frame format defined by the communication protocol is omitted,
   the beacon frame format indicates that a payload of a beacon frame includes a device identification information field, a plurality of access phase information fields, and a MAC Capability field, and
   the frame generating device sends the generated beacon frame to the other device via the communication circuit,
   wherein the frame generating device generates a beacon frame so that the MAC Capability field is omitted in the case that the other device is being connected to the frame generating device, and
   the frame generating device generates a beacon frame so that at least one of the plurality of access phase information fields is omitted in the case that the frame generating device does not allow a connection with the other device.

2. The frame generating device of claim 1, wherein the frame generating device generates a beacon frame so that the beacon frame includes the plurality of fields specified by the beacon frame format defined by the communication protocol in the case that the frame generating device is not connected to any other devices.

3. The frame generating device of claim 1, wherein the frame generating device includes discrimination information indicating that the at least one field is omitted in the beacon frame.

4. The frame generating device of claim 3, wherein the discrimination information is contained in a reserved field of a Frame Control field of a MAC header of the beacon frame.

5. The frame generating device of claim 3, wherein the discrimination information is changed according to the kind of the at least one field which is omitted.

6. The frame generating device of claim 3, wherein the frame generating device operates in a normal mode in the case that the discrimination information has a first value, and operates in a low-power mode in the case that the discrimination information has a second value, and power consumption of the device in the low-power mode is less than that in the normal mode.

7. An Electronic timepiece comprising:
   the frame generating device of claim 1; and
   a counter configured to count current time.

8. A frame generating method performed by a device for communicating with another device via a communication circuit according to a specific communication protocol, comprising:
   generating a frame based on a frame format defined by the communication protocol; and
   generating a beacon frame so that at least one of a plurality of fields specified by a beacon frame format defined by the communication protocol is omitted, and
   sending the generated beacon frame to the other device via the communication circuit,
   wherein the beacon frame format indicates that a payload of a beacon frame includes a device identification information field, a plurality of access phase information fields, and a MAC Capability field,
   in the case that other device is being connected to the device, the MAC Capability field is omitted in the beacon frame, and
   in the case that the device does not allow a connection with the other device, at least one of the plurality of access phase information fields is omitted in the beacon frame.

9. A non-transitory computer-readable recording medium for recording a computer program controlling a device for communicating with another device via a communication circuit according to a specific communication protocol, the program causing the device to perform steps of:
   generating a frame based on a frame format defined by the communication protocol;
   generating a beacon frame so that at least one of a plurality of fields specified by a beacon frame format defined by the communication protocol is omitted; and
   sending the generated beacon frame to the other device via the communication circuit,
   wherein the beacon frame format indicates that a payload of a beacon frame includes a device identification information field, a plurality of access phase information fields, and a MAC Capability field,
   in the case that the other device is being connected to the device, the MAC Capability field is omitted in the beacon frame, and in the case that the device does not allow a connection with the other device, at least one of the plurality of access phase information fields is omitted in the beacon frame.

10. A frame generating device for generating frames to communicate with other devices via a communication circuit according to a specific communication protocol, comprising:
   a memory configured to store history information on history of connections between the frame generating device and the other devices,
   wherein the frame generating device generates a frame based on a frame format defined by the communication protocol,
   the frame generating device generates a beacon frame so that at least one of a plurality of fields specified by a beacon frame format defined by the communication protocol is omitted, and
   the frame generating device sends the generated beacon frame to the other devices via the communication circuit,
   wherein the frame generating device determines one or more fields to be omitted of the plurality of fields specified by the beacon frame format defined by the communication protocol based on the history information, and generates a beacon frame so that the determined one or more frames are omitted.

11. The frame generating device of claim 10, wherein the history information indicates a number of the other devices which are being connected to the frame generating device.

* * * * *